United States Patent
Yaoi et al.

(10) Patent No.: US 8,470,447 B2
(45) Date of Patent: Jun. 25, 2013

(54) EASY OPEN ENDS THAT CAN BE FAVORABLY OPENED AT HIGH TEMPERATURES

(75) Inventors: Etsuko Yaoi, Yokohama (JP); Yasufumi Tadaki, Yokohama (JP); Toshio Sue, Yokohama (JP); Kazuhiro Sato, Yokohama (JP); Satoshi Fujita, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 853 days.

(21) Appl. No.: 12/281,562

(22) PCT Filed: Mar. 2, 2007

(86) PCT No.: PCT/JP2007/054612
§ 371 (c)(1),
(2), (4) Date: Sep. 3, 2008

(87) PCT Pub. No.: WO2007/102596
PCT Pub. Date: Sep. 13, 2007

(65) Prior Publication Data
US 2009/0047524 A1    Feb. 19, 2009

(30) Foreign Application Priority Data
Mar. 6, 2006    (JP) ................................. 2006-059365

(51) Int. Cl.
| B32B 27/38 | (2006.01) |
| B32B 27/42 | (2006.01) |
| B32B 15/092 | (2006.01) |
| B32B 15/098 | (2006.01) |

(52) U.S. Cl.
USPC ........... 428/457; 428/413; 428/414; 428/416; 428/418; 428/460; 428/524

(58) Field of Classification Search
USPC ................. 428/457, 413, 414, 416, 418, 460, 428/524
See application file for complete search history.

(56) References Cited

U.S. PATENT DOCUMENTS

| 4,397,401 A | * | 8/1983 | Ueno et al. ..................... 220/260 |
| 4,828,136 A | * | 5/1989 | Kawahara et al. ............. 220/270 |
| 5,116,651 A | * | 5/1992 | Katsura et al. ............... 428/35.7 |
| 5,204,181 A | | 4/1993 | Suzuki et al. |
| 6,127,473 A | * | 10/2000 | Yoshida et al. ............... 524/493 |

FOREIGN PATENT DOCUMENTS

| EP | 1780312 A1 | 5/2007 |
| EP | 1982923 A1 | 10/2008 |
| JP | 62-052045 A | 3/1987 |
| JP | 09-012028 A | 1/1997 |
| JP | 11-124134 A | 5/1999 |
| JP | 2000-202944 A | 7/2000 |

(Continued)

Primary Examiner — Michael Pepitone
(74) Attorney, Agent, or Firm — Sughrue Mion, PLLC (57) ABSTRACT

An easy open end comprising a resin-coated metal plate obtained by coating a metal substrate with a polyester film via a primer, wherein the primer comprises an epoxy resin or a polyester resin and a resole-type phenol resin, and the resole-type phenol resin has 0.2 to 2.0 methylol groups per a benzene ring. The end can be lightly opened without causing defect at the time of opening the end by pushing in the end of a tab and cutting the score and, particularly, can be excellently opened at high temperatures without arousing the problem even in a state of being heated at high temperatures featuring excellent corrosion resistance, resistance against the content and retort resistance.

2 Claims, 1 Drawing Sheet

FOREIGN PATENT DOCUMENTS

| | | |
|---|---|---|
| JP | 2000-202945 A | 7/2000 |
| JP | 2005-126097 A | 5/2005 |
| WO | 2005123991 A1 | 12/2005 |
| WO | 2007091740 A1 | 8/2007 |

* cited by examiner

EASY OPEN ENDS THAT CAN BE FAVORABLY OPENED AT HIGH TEMPERATURES

TECHNICAL FIELD

The present invention relates to an easy open end made of a resin-coated metal plate. More specifically, the invention relates to an easy open end which can be favorably opened upon pushing in the end of a tab for opening and cutting the score and, particularly, even in a state of being heated at high temperatures.

BACKGROUND ART

A so-called easy open end has heretofore been widely used as a container end that can be easily unsealed by hand without using any particular utensils. From the standpoint of workability, the container end is made of a metal blank such as a tin plate, a surface-treated steel plate like TFS or a resin-coated metal plate obtained by coating an aluminum alloy with a resin coating such as a polyester film, the container end made of the above metal plate being provided with a score extending in the way in the direction of thickness of the metal plate so as to sectionalize a portion for opening. A rivet is formed by the end plate in the portion for opening, a pull-tab is fixed by the rivet, and the end is double-seamed with the flange such as a can body member.

An easy open end of this kind has been proposed being made of a composite member comprising an aluminum substrate, a biaxially drawn polyethylene terephthalate film of a thickness of 10 to 40 μm on a side of the substrate that becomes the inside of a can made of the aluminum substrate, and an epoxy-phenol resin type adhesive primer layer of a thickness of 0.3 to 3 μm interposed between the aluminum substrate and the film, and having a score formed in the aluminum substrate extending in the way in the direction of thickness thereof (JP-A-62-52045).

The easy open end of the type of stay-on tab (SOT) is opened by pushing in the end of a tab for opening and cutting the score. The opening operation causes the score to be cut in a manner that the resin layer on the inner surface side of the laminated board stretches giving rise to the occurrence of delamination between the metal blank and the inner resin layer. Therefore, the metal blank is cut and, thereafter, the resin layer is cut being deviated in time, and the user feels it stiff and sticky to open the end but may not feel the end is lightly opened.

Particularly, a canned product packing soup, coffee, black tea or green tea is in many cases heated in hot water or in a hot vendor, and is opened. In this case, the inner resin layer is in a state where it can be easily stretched, and the above tendency becomes conspicuous.

To solve the above problem, there has been proposed an easy open end which can be favorably opened and, particularly, even at high temperatures by selecting a difference between the mountain and the valley (maximum height of roughness) on the side of the metal blank that becomes the inner surface of the container to lie in a range of 0.05 to 20 μm and selecting a bubble area ratio to be not larger than 30% in the interface between the metal blank and the resin layer (JP-A-11-124134).

DISCLOSURE OF THE INVENTION

The easy open end disclosed in the above prior art is to improve the openability by smoothing the metal blank and by improving the close adhesion in the interface between the metal blank and the resin layer. However, it is desired to improve the openability and, particularly, the openability at high temperatures irrespective of the surface condition of the metal blank.

It is therefore an object of the present invention to provide an easy open end which can be favorably opened without causing defect at the time of opening the end by pushing in the end of a tab and cutting the score and, particularly, can be excellently opened at high temperatures without arousing the above-mentioned problem even in a state of being heated at high temperatures featuring excellent corrosion resistance, resistance against the content and retort resistance.

According to the present invention, there is provided an easy open end featuring excellent openability at high temperatures, comprising a resin-coated metal plate obtained by coating a metal substrate with a polyester film via a primer, wherein the primer comprises an epoxy resin or a polyester resin and a resole-type phenol resin, and the resole-type phenol resin has 0.2 to 2.0 methylol groups per a benzene ring.

In the easy open end of the invention, it is desired that:
1. The blending ratio (weight ratio) of the polyester resin and the resole-type phenol resin is 60:40 to 80:20;
2. The blending ratio (weight ratio) of the epoxy resin and the resole-type phenol resin is 60:40 to 85:15;
3. The polyester resin contains not less than 30% by weight of a carboxyl group-introduced polyester resin;
4. The carboxyl group-introduced polyester resin has an acid value of 150 to 800 meq/kg; and
5. The epoxy resin has a number average molecular weight in a range of 2,800 to 8,000.

According to the present invention, there is provided the easy open end which can be lightly opened and, particularly, even in a state of being heated at high temperatures.

The easy open end of the invention further offers such advantages as excellent corrosion resistance, resistance against the content and retort resistance.

The easy open end of the present invention has an important feature in that the primer used at the time of coating the metal substrate with the polyester film comprises an epoxy resin or a polyester resin and a resole-type phenol resin, the resole-type phenol resin having 0.2 to 2.0 methylol groups per a benzene ring.

In the present invention, the primer having the above constitution excellently adheres to the polyester film and, particularly, to the polyethylene terephthalate film. At the time of cutting the score and forming the opening, therefore, the polyester film follows the cutting of metal substrate, and the opening operation can be lightly carried out.

It is important that the primer in the present invention uses the resole-type phenol resin having 0.2 to 2.0 methylol groups per a benzene ring. The curing reaction of the primer comprising the epoxy resin or the polyester resin and the resole-type phenol resin is chiefly the reaction of a methylol group in the phenol resin with a hydroxyl group in the epoxy resin or with a hydroxyl group and a carboxyl group in the polyester resin. The reaction becomes active with an increase in the number of the methylol groups. The methylol groups in the resole-type phenol resin have a large affinity to the polyester film and adhere particularly excellently to the polyester film.

Therefore, delamination does not occur between the metal substrate and the polyester film at the time of forming the opening by cutting the score; i.e., the metal substrate is cut simultaneously with the cut of the polyester film, and the opening operation can be lightly conducted.

As described above, further, when heated at a high temperature, the opening operation is conducted in a state where the inner resin layer can be easily elongated and becomes inferior to the opening operation in a state of low temperatures. However, use of the primer of the invention improves the adhesion between the primer and the metal substrate, and between the primer and the polyester film to a striking degree and, therefore, helps maintain excellent openability at high temperatures.

The above action and effect of the invention will become obvious even from the results of Examples appearing later.

That is, excellent openability is obtained at high temperatures when there is used a primer comprising an epoxy resin or a polyester resin and a resole-type phenol resin having 0.2 to 2.0 methylol groups per a benzene ring (Examples 1 to 44). When the number of methylol groups per a benzene ring is smaller than the above range, on the other hand, the adhesion is not obtained to a sufficient degree, and satisfactory openability is not realized at high temperatures (Comparative Examples 1, 2, 4, 5, 7, 8, 10, 11, 13, 14, 16, 17, 19 and 20). When the number of methylol groups per a benzene ring is not smaller than the above range, further, the methylol groups undergo the condensation reaction, adhesion becomes inferior between the metal substrate and the polyester film, delamination occurs, and satisfactory openability is not realized at high temperatures (Comparative Examples 3, 6, 9, 12, 15, 18 and 21).

BEST MODE FOR CARRYING OUT THE INVENTION (Primer)

The primer used in the present invention comprises an epoxy resin or a polyester resin and a resole-type phenol resin, the resole-type phenol resin having methylol groups in a number of 0.2 to 2.0 and, particularly, 0.2 to 1.5 per a benzene ring.

In the primer of the present invention, it is desired that the blending ratio (weight ratio) of the polyester resin and the resole-type phenol resin is in a range of 60:40 to 80:20 and, particularly, 65:35 to 75:25, and that the blending ratio (weight ratio) of the epoxy resin and the resole-type phenol resin is in a range of 60:40 to 85:15 and, particularly, 65:35 to 80:20. When the blending amount of the resole-type phenol resin is smaller than the above range, the primer is not cured to a sufficient degree and, as a result, close adhesion and corrosion resistance decrease. On the other hand, when the blending amount of the resole-type phenol resin is larger than the above range, the primer layer becomes brittle, the interface breaks between the primer layer and the metal plate at the time of working the resin-coated metal plate, and the close adhesion and corrosion resistance tend to decrease. The close adhesion is not obtained, either, if the phenol resin is not the one of the resole type.

(Polyester Resin)

As the polyester resin used for the primer, there can be used a known polyester resin comprising a dicarboxylic acid component that will be described later and a diol component. In the present invention, in particular, there can be preferably used a polyester resin containing a carboxyl group-introduced polyester resin in an amount of not smaller than 30% by weight and, particularly, in an amount of 40 to 80% by weight. By using the carboxyl group-introduced polyester resin in an amount in the above range, close adhesion is improved between the primer layer and the metal plate, and between the primer layer and the polyester film, and excellent openability is obtained at high temperatures as compared to when the carboxyl group-introduced polyester resin is not used in amounts in the above range.

[Carboxyl Group-Introduced Polyester Resin]

The polyester resin is the one obtained by the ring-opening addition reaction of a polyester with a compound having a carboxylic anhydride group. The compound used in the ring-opening addition reaction contains at least a carboxylic polyanhydride, and a polyester resin that is used has a resin acid value of 150 meq/kg to 800 meq/kg and a number average molecular weight of 5,000 to 100,000 calculated as styrene.

When the resin acid value is smaller than the above range, the polyester resin disperses less than when the resin acid value is in the above range, and the preservation of the dispersion tends to lose stability. When the resin acid value is larger than the above range, on the other hand, the retort resistance tends to decrease as compared to when the resin acid value is within the above range. Further, when the number average molecular weight calculated as styrene is smaller than the above range, the primer layer tends to become brittle, and the workability and retort resistance become inferior to when the number average molecular weight calculated as styrene is in the above range. When the number average molecular weight calculated as styrene is larger than the above range, on the other hand, the coating workability tends to decrease.

As the carboxylic acid component used for the polyester resin, there can be exemplified aromatic dicarboxylic acids such as terephthalic acid, isophthalic acid, orthophthalic acid and naphthalenedicarboxylic acid; aliphatic dicarboxylic acids such as succinic acid, glutaric acid, adipic acid, azelaic acid, sebacic acid, dodecanedioic acid and dimeric acid; unsaturated dicarboxylic acids such as (anhydrous) maleic acid, fumaric acid and terpene-maleic acid adduct; alicyclic dicarboxylic acids such as 1,4-cyclohexanedicarboxylic acid, tetrahydrophthalic acid, hexahydroisophthalic acid and 1,2-cyclohexenedicarboxylic acid; trivalent or more highly valent carboxylic acids such as (anhydrous) trimellitic acid, (anhydrous) pyromellitic acid and methylcyclohexenetricarboxylic acid; and monocarboxylic acids such as 4,4-bis(4'-hydroxyphenyl)pentanoic acid, 4-mono(4'-hydroxyphenyl) pentanoic acid and p-hydroxybenzoic acid, from which one or two or more kinds thereof can be selected and used.

As the polyhydric alcohol component used for the polyester resin, there can be exemplified aliphatic glycols such as ethylene glycol, propylene glycol (1,2-propanediol), 1,3-propanediol, 1,4-butanediol, 1,2-butanediol, 1,3-butanediol, 2-methyl-1,3-propanediol, neopentyl glycol, 1,5-pentanediol, 1,6-hexanediol, 3-methyl-1,5-pentanediol, 2-ethyl-2-butyl-1,3-propanediol, 2,4-diethyl-1,5-pentanediol, 1-methyl-1,8-octanediol, 3-methyl-1,6-hexanediol, 4-methyl-1,7-heptanediol, 4-methyl-1,8-octanediol, 4-propyl-1,8-octanediol and 1,9-nonanediol; ether glycols such as diethylene glycol, triethylene glycol, polyethylene glycol, polypropylene glycol and polytetramethylene glycol; alicyclic polyalcohols such as 1,4-cyclohexanedimethanol, 1,3-cyclohexanedimethanol, 1,2-cyclohexanedimethanol, tricyclodecane glycols and hydrogenated bisphenols; and trivalent or more highly valent polyalcohols such as trimethylolpropane, trimethylolethane and pentaerythritol, from which one kind or more kinds thereof can be selected and used.

The polyester resin obtained by the ring-opening addition reaction of the polyester with the compound having the carboxylic anhydride group contains the carboxylic polyanhydride in an amount of at least not smaller than 10 mol % of the compounds used for the ring-opening addition reaction. Of the compounds having the carboxylic anhydride group, the carboxylic polyanhydride undergoes the ring-opening addition reaction with the polyester resin, and the polyester resin molecular chain acquires a pendant-like structure having a divalent carboxyl group.

As the compound having the carboxylic polyanhydride group, there can be exemplified anhydrous pyromellitic acid, 1,2,3,4-butanetetracarboxylic dianhydride, 1,2,3,4-pentanetetracarboxylic dianhydride, 3,3',4,4'-benzophenonetetracarboxylic dianhydride, cyclopentanetetracarboxylic dianhydride, 2,3,6,7-naphthalenetetracarboxylic dianhydride, 1,2,5,6-naphthalenetetracarboxylic dianhydride, ethylene glycol bistrimellitic dianhydride, 2,2',3,3'-diphenyltetracarboxylic dianhydride, thiophene-2,3,4,5-tetracarboxylic dianhydride, ethylene tetracarboxylic dianhydride, 4,4'-oxydiphthalic dianhydride, and 5-(2,5-dioxotetrahydro-3-furanyl)-3-methyl-3-cyclohexene-1,2-dicarboxylic anhydride, from which one kind, two kinds or more kinds thereof can be selected and used. Among the above carboxylic polyanhydrides, the ethylene glycol bistrimellitic dianhydride is most desirably used.

Of the compounds having the carboxylic anhydride group in the molecules which undergo the ring-opening addition reaction with the polyester resin, the carboxylic monoanhydrides may be such monoanhydrides as anhydrous phthalic acid, anhydrous succinic acid, anhydrous maleic acid, anhydrous trimellitic acid, anhydrous itaconic acid, anhydrous citraconic acid, and 5-(2,5-dioxotetrahydrofurfuryl)-3-cyclohexene-1,2-dicarboxylic anhydride, as well as hexahydrophthalic anhydride and tetrahydrophthalic anhydride, from which one kind, two kinds or more kinds thereof can be selected and used.

There is no particular limitation on the method of obtaining the polyester resin used for the primer by adding a compound having a carboxylic anhydride group in the molecules thereof, and there can be employed a known method.

It is desired that the compound having the carboxylic anhydride group in the molecules thereof that undergoes the ring-opening addition reaction with the polyester resin, comprises a carboxylic polyanhydride in an amount of not less than 10 mol % in the total amount of 100 mol % thereof, and other carboxylic monoanhydride. With the amount of the carboxylic polyanhydride not being less than 10 mol %, the polyester resin disperses more favorably, the polyester molecular chain acquires a higher molecular weight, and the workability is improved, which is desirable.

It is further desired that the polyester resin has a glass transition temperature (Tg) in a range of 0° C. to 120° C. and, particularly, 40 to 100° C. from the standpoint of openability at high temperatures.

(Epoxy Resin)

As the epoxy resin, there can be used known epoxy resin that has heretofore been used for the primer. In the present invention, it is desired to use an epoxy resin having a relatively high molecular weight, e.g., having a number average molecular weight in a range of 2,800 to 8,000 and, particularly, in a range of 3,200 to 6,000. It is further desired that the epoxy equivalent thereof is in a range of 1,700 to 7,000 and, particularly, 2,000 to 5,500. When the molecular weight and the epoxy equivalent are smaller than the above ranges, the primer exhibits decreased toughness and the close adhesion tends to decrease. When the molecular weight and the epoxy equivalent are larger than the above ranges, the close adhesion and the corrosion resistance tend to decrease.

As the epoxy resin, there can be used any one of, for example, bisphenol A type epoxy resin, bisphenol F type epoxy resin, brominated epoxy resin or cyclic aliphatic epoxy resin. Usually, however, the bisphenol A type epoxy resin or the bisphenol F type epoxy resin is used.

(Resole-Type Phenol Resin)

It is desired that the resole-type phenol resin is a copolymer of a phenol compound containing not less than 50 mass % of a trifunctional or more highly functional phenol compound and a formaldehyde.

As the trifunctional or more highly functional phenol compound, there can be exemplified phenol, m-cresol, m-ethylphenol, 3,5-xylenol, m-methoxyphenyl, bisphenol-A and bisphenol-F, which can be used in one or two or more kinds being mixed together.

In addition to being blended with the trifunctional phenol compound, the starting material of the resole-type phenol resin used in the present invention may be blended with a bifunctional phenol compound such as o-cresol, p-cresol, p-tert-butylphenol, p-ethylphenol, 2,3-xylenol or 2,5-xylenol in amounts of smaller than 50 mass % so will not to hinder the properties.

The resole-type phenol resin is obtained methylolating a resol-type phenol resin containing not less than 50 mass % of a trifunctional or more highly functional phenol compound with formalin, formit, paraformaldehyde or trioxane.

When an epoxy resin is to be used as the primer component, there can be used various resole-type phenol resins without any particular limitation. When the polyester resin is to be used, however, an m-cresol can be favorably used as the resole-type phenol resin.

(Preparation of the Primer)

When the polyester resin and the resole-type phenol resin are used for the primer of the present invention, it is desired that the weight ratio of the polyester resin and the resole-type phenol resin is 60:40 to 80:20 and, particularly, 65:35 to 75:25. When the epoxy resin and the resole-type phenol resin are used for the primer of the present invention, it is desired that the weight ratio of the epoxy resin and the resole-type phenol resin is 60:40 to 85:15 and, particularly, 65:35 to 80:20. These resins are blended being dissolved in an organic solvent to prepare the primer.

As a curing catalyst, here, it is desired to use an acid catalyst in an amount of 0.01 parts by mass to 3 parts by mass per 100 parts by mass of the whole resin components (polyester resin or epoxy resin and resole-type phenol resin). As the acid catalyst, there can be exemplified sulfuric acid, p-toluenesulfonic acid, dodecylbenzenesulfonic acid, naphthalenesulfonic acid, dinonylnaphthalenesulfonic acid, dinonylnaphthalenedisulfonic acid, camphorsulfonic acid, phosphoric acid, and the above acids which are blocked with an amine (above acids which are partly neutralized by adding amine thereto), from which one or two or more kinds thereof may be selected and used in combination. Among these acid catalysts, it is particularly desired to use the dodecylbenzenesulfonic acid or the dodecylbenzenesulfonic acid which is blocked with the amine from the standpoint of compatibility with the resin and sanitation.

As the organic solvent, there can be used alcohols such as ethanol, n-propanol, isopropanol, n-butanol, isobutanol, sec-butanol, tert-butanol, isoamyl alcohol, sec-amyl alcohol, tert-amyl alcohol, n-hexanol and cyclohexanol; ketones such as methyl ethyl ketone, methylisobutyl ketone, and ethylbutyl ketone; cyclic ethers such as tetrahydrofurane, dioxane and 1,3-dioxolane; glycol derivatives such as ethylene glycol, ethylene glycol monomethyl ether, ethylene glycol monoethyl ether, ethylene glycol monobutyl ether, ethylene glycol monoethyl ether acetate, diethylene glycol diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether and propylene glycol methyl ether acetate; as well as 3-methoxy-3-methyl butanol, 3-methoxybutanol, acetonitrile, dimethylformamide, dimethylacetoamide, diacetone alcohol, ethyl acetoacetate and cyclohexanone.

Thereafter, as required, the organic solvent used for dissolving the polyester resin or the epoxy resin can be distilled off by heating or under a reduced pressure. It is desired that the organic solvent is distilled off under a reduced pressure at not higher than 100° C. and, more preferably, not higher than 80° C. from the standpoint of suppressing the condensation of the resole-type phenol resin with the heat of distilling off the organic solvent. In this case, a completely aqueous resin composition can be obtained if the organic solvent is all distilled off. From the standpoint of stability of the dispersion and film-forming property, however, it is desired that the organic solvent is contained in an amount of 3 mass % to 20 mass %.

The primer can be applied by a known method such as roll coating method, spray method, dipping method or brush coating method. Further, though there is no particular limitation, it is desired that the film has a thickness, usually, in a range of 0.3 μm to 3 μm in a dry state. It is desired that the film is baked under the conditions of a temperature of 80 to 150° C. for 5 seconds to one minute.

(Polyester Film)

The polyester film is a resin coating with which the metal plate used for the easy open end of the invention is coated, and is a film comprising a polyester resin that has hitherto been used for the conventional resin-coated metal plates.

The polyester resin may be a homopolyethylene terephthalate but may also be a simple substance of copolymerizable polyester which contains an acid component other than the terephthalic acid in an amount of not more than 30 mol % on the basis of acid component or contains an alcohol component other than the ethylene glycol in an amount of not more than 30 mol % on the basis of the alcohol component, or may be a blend thereof.

As the acid component other than the terephthalic acid, there can be exemplified isophthalic acid, naphthalenedicarboxylic acid, cyclohexanedicarboxylic acid, P-β-oxyethoxybenzoic acid, diphenoxyethane-4,4'-dicarboxylic acid, 5-sodiumsulfoisophthalic acid, hexahydroterephthalic acid, succinic acid, adipic acid, sebacic acid, dodecanedioic acid, dimeric acid, trimellitic acid and pyromellitic acid.

As the alcohol component other than the ethylene glycol, there can be exemplified glycol components such as propylene glycol, 1,4-butanediol, neopentyl glycol, 1,6-hexylene glycol, diethylene glycol, triethylene glycol, cyclohexane dimethanol, ethylene oxide adduct of bisphenol A, trimethylolpropane and pentaerythritol.

The polyester must have a molecular weight in a range of forming films and an intrinsic viscosity [η] of not smaller than 0.5 and, particularly, in a range of 0.52 to 0.70 as measured by using a phenol/tetrachloroethane mixed solvent from the standpoint of barrier property against the corrosive component and the mechanical properties. From the standpoint of improving the openability at high temperatures, further, it is desired that the polyester has a glass transition point of not lower than 50° C. and, particularly, in a range of 60 to 80° C.

Desirably, the polyester is any one of polyethylene terephthalate, polyethylene terephthalate copolymerized with isophthalic acid, polyethylene terephthalate copolymerized with naphthalene dicarboxylic acid or a blend of polyethylene terephthalate/polybutylene terephthalate.

The polyester film may be blended with known blending agents used for films, such as lubricant, anti-blocking agent, pigment, antistatic agents and antioxidant according to a known recipe.

The polyester film may be undrawn but is desirably biaxially drawn. The biaxially drawn film is usually drawn into 3 to 5 times in the transverse direction and into 3 to 5 times in the longitudinal direction and, desirably, has a thickness, usually, in a range of 10 to 40 μm.

In the present invention, the polyester film forms a surface layer on the easy open end on the side of the inner surface thereof or may assume a two-layer constitution having a lower layer formed on the side of the metal plate.

As the lower layer, there can be used any one of the above-mentioned polyester resins and, particularly, a polyester resin comprising chiefly an ethylene terephthalate unit containing at least one of isophthalic acid or naphthalenedicarboxylic acid in an amount of 1 to 30 mol % which is larger than the amount of the acid component in the polyester film which is the upper layer from the standpoint of maintaining close adhesion during the working and dent resistance.

When the two-layer constitution is employed, it is desired that the lower layer has a thickness in a range of 5 to 32 μm, and the ratio of thickness of the upper layer and the lower layer is in a range of 1:1 to 1:4 from the standpoint of workability and corrosion resistance.

(Metal Plate)

As the metal plate, there can be used various surface-treated steel plates and light metal plates such as of an aluminum alloy. As the surface-treated steel plate, there can be used a known cold-rolled steel plate which is subjected to one or two or more kinds of surface treatments, such as zinc plating, tin plating, nickel plating, electrolytic chromate treatment and chromate treatment. The steel plate may be the one that is rolled one time or two times. There can be further used an aluminum-coated steel plate which is plated with aluminum or is subjected to the aluminum rolling. As the light metal plate, there is used an aluminum alloy plate in addition to the so-called pure aluminum plate. Concrete examples of the aluminum alloy plate include aluminum, aluminum-copper alloy, aluminum-manganese alloy, aluminum-silicon alloy, aluminum-magnesium alloy, aluminum-magnesium-silicon alloy, aluminum-zinc alloy, aluminum-zinc-magnesium alloy, a core material of an aluminum alloy and a clad material of a pure aluminum layer having an aluminum purity of not less than 99.5%. It is further desired to form a film on the surfaces of the aluminum member through the inorganic surface treatment such as chromium phosphate treatment, zirconium phosphate treatment or phosphate treatment, through the organic surface treatment such as polyacrylate treatment, phenol resin treatment or tannate treatment, or through the organic/inorganic composite surface treatment of a combination of the above treatments. When the polyester primer is used, it is desired that the metal plate is subjected to the organic/inorganic composite surface treatment.

The initial thickness of the metal plate may differ depending upon the kind of the metal, use or size of the container but is, usually, 0.10 to 0.50 mm. When the metal plate is a surface-treated steel plate, it is desired that the thickness thereof is 0.10 to 0.30 mm. When the metal plate is a light metal plate, it is desired that the thickness thereof is 0.15 to 0.40 mm.

(Resin-Coated Metal Plate)

Figure 1:
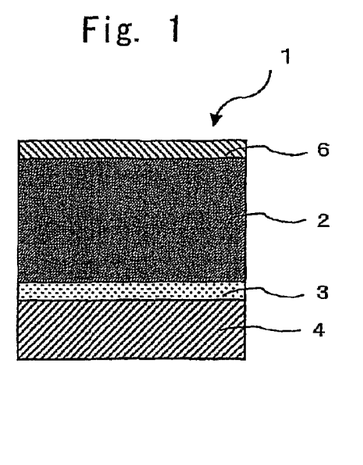
FIG. 1 is a sectional view illustrating a resin-coated metal plate used in the present invention.

FIG. 1 is a view illustrating a sectional structure of a resin-coated metal plate used for the easy open end of the present invention. The resin-coated metal plate of the invention generally designated at 1 includes a metal plate 2 and a polyester film 4 formed, via a primer layer 3, on the surface of the metal plate 2 on the side that becomes the inside of the easy open end.

Figure 2:
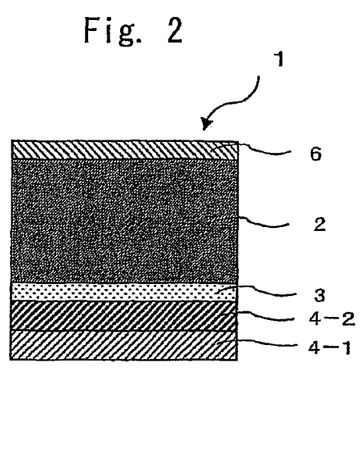
FIG. 2 is a sectional view illustrating another resin-coated metal plate used in the present invention.

FIG. 2 illustrates the resin-coated metal plate of FIG. 1 but in which the polyester film 4 has a two-layer constitution including an upper layer 4-1 and a lower layer 4-2 on the side of the primer layer 3. Further, a protection film 6 is formed on the surface of the metal plate 2 on the side that becomes the outer surface of the easy open end.

The primer and the polyester film may be formed even on the outer surface of the easy open end.

The resin-coated metal plate used in the invention is obtained by applying the primer and the polyester film by known methods. According to the present invention, however, the polyester film is formed in advance and the primer is applied to the polyester film which is, then, laminated on the metal plate.

(Easy Open End)

The easy open end of the invention can be formed in a customary manner but placing the surface of the resin-coated metal plate on which the polyester film is formed to be on the inside of the end. The easy open end of the invention may be either of the full-open type or the partial-open type.

The easy open end is formed by, first, punching the resin-coated metal plate into a disk through the press-forming step, which is, then, formed into an end of a desired shape. Next, in a step of engraving a score, the score is engraved from the outer surface side of the end so that the score reaches in the way in the direction of thickness of the metal blank by using a score dies. In the step of forming a rivet, the rivet is formed in the to-be-opened portion sectionalized by the score so as to protrude to the outer surface by using a rivet-forming dies. In the step of attaching a tab, the tab for opening is fitted to the rivet and is fixed by using the protruded portion of the rivet to thereby form an easy open end.

Figure 3:
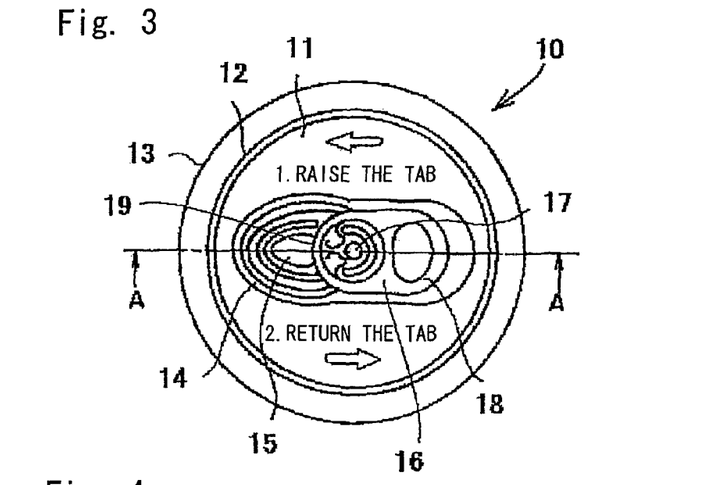
FIG. 3 is a top view of an easy open end of the present invention.
Figure 4:
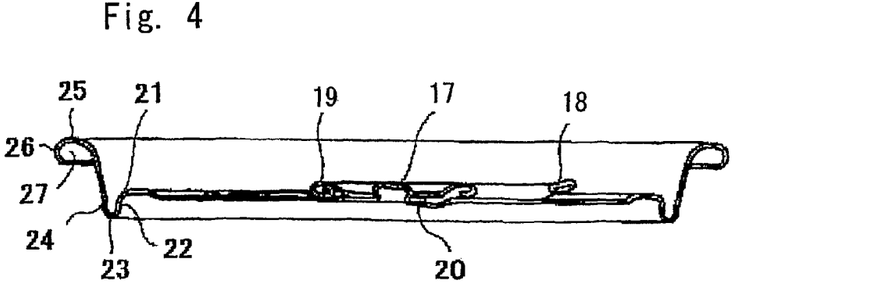
FIG. 4 is an enlarged sectional view along the line A-A in FIG. 3.

FIGS. 3 and 4 illustrate an easy open end of the partial-open type which is an example of the easy open end of the invention, wherein FIG. 3 is a top view and FIG. 4 is a sectional view along the line A-A in FIG. 3.

The easy open end of the invention generally designated at 10 includes a central panel portion 11, a reinforcing ring-like groove 12, and an outermost circumferential wrap-seamed portion 13. The central panel portion 11 has a to-be-opened portion 15 surrounded by a score 14, and a tab 16 for opening is fixed via a rivet 17. The tab 16 for opening has a grip ring 18, an end 19 for pushing and a rivet-fixing tongue piece 20, the end 19 for pushing being so attached as to be overlapped on the to-be-opened portion 15. The reinforcing ring-like groove 12 extends from the central panel portion 11 through a central panel radius portion 21 and includes an inner wall portion 22, a radius portion 23 and an outer wall portion (chuck wall) 24. The outer wall portion 24 is continuous to a seaming panel portion 25 and to a curl portion 26. A groove 27 is formed on the back sides of the seaming panel portion 25 and of the curl portion 26. The groove 27 is lined with a sealing composition (not shown) to accomplish the sealing relying on a double seaming with a can body flange (not shown).

EXAMPLES

The invention will be described more concretely by way of Examples to which only, however, the invention is in no way limited. In Examples, further, "parts" are all "parts by mass" unless stated otherwise.

(Washing the Aluminum Alloy Plate)

A commercially available aluminum-magnesium alloy plate (JIS 5021, plate thickness: 0.25 mm) was treated by spraying a commercially available strongly alkaline dewaxing agent ("Fine Cleaner 4377" manufactured by Nihon Parkarizing Co.) under the conditions of a chemical concentration of 20 g/L, a treating temperature of 60° C. and a treating time of 7 seconds. Thereafter, the alkali component remaining on the surface was washed away with the tap water.

(Treating the Aluminum Alloy Plate)

1. Treatment with Chromium Phosphate (Examples 1 to 10, Comparative Examples 1 to 6).

The obtained aluminum alloy plate was treated for its surfaces by spraying a surface-treating solution "Alchrome K 702" manufactured by Nihon Parkarizing Co. at a temperature of 50° C. for 5 seconds. The unreacted products were washed away with the tap water. The aluminum alloy plate was further washed with the deionized water of 3,000,000Ω or greater, followed by drying at 80° C. to obtain the surface-treated aluminum plate having a chromium phosphate film formed thereon.

2. Treatment with Zirconium Phosphate (Examples 11 to 20, Comparative Examples 7 to 12).

A surface-treated metal plate was obtained having a zirconium phosphate film formed thereon under the same conditions as those of the above-mentioned washing step and the spray treatment, but using "Arozine N-405" manufactured by Nihon Parkarizing Co. as a treating agent.

3. Organic/Inorganic Composite Treatment A (Examples 21 to 40, Comparative Examples 13 to 21).

Preparation of the Polymer

A water-soluble polymer represented by the following formula was used, (1)

wherein φ is a benzene ring, and X is a hydrogen atom or a group Z=—CH$_2$N(CH$_3$)$_2$,
the introduction ratio of the groups Z being 0.5 groups per a benzene ring, and when Xs are all hydrogen atoms, the polymer has an average molecular weight of 3,000.

Calculation of Introduction Ratio of the Groups Z.

Elements C, H, N and S contained in the polymer prepared above were determined by using an element analyzer, Model EA1108 manufactured by FISONS Co. The introduction ratio of the groups Z was calculated from the determined results.

Preparation of a Treating Solution.

Ion-exchanged water of a normal temperature was fed into a vessel equipped with a stirrer. To the vessel were further added 71 g/L of 40% zirconium hydrofluoric acid (containing Zr in an amount of 17.6%), 15 g/L of 85% phosphoric acid, and 9 g/L of 55% hydrofluoric acid at normal temperature with stirring. Next, 40 g/L of the above polymer was dissolved therein with stirring. Thereafter, the solution was diluted to 4% with the ion-exchanged water and ammonia was added thereto to adjust the pH to 3.0 to thereby obtain a pale yellowish surface-treating solution.

The above washed aluminum alloy plate was treated for its surfaces by spraying the surface-treating solution prepared above at a temperature of 50° C. for 5 seconds. The unreacted products were washed away with the tap water. The aluminum alloy plate was further washed with the deionized water of 3,000,000Ω or greater, followed by drying at 80° C. to obtain the surface-treated aluminum plate having an organic/inorganic composite treating layer A.

The amounts of components in the film were such that the zirconium compound was 10 mg/m$^2$ calculated as zirconium atoms, the phosphorus compound was 5 mg/m$^2$ calculated as phosphorus atoms, and the organic compound was 35 mg/m$^2$ calculated as carbon atoms.

4. Organic/Inorganic Composite Treatment B (Examples 41 to 44).

9956.3 Grams of the ion-exchanged water was fed into a vessel equipped with a stirrer. 11.5 Grams of the zirconium hydrofluoric acid (containing Zr in an amount of 17.6%) was gradually added thereto at normal temperature with stirring. Further, 4.2 grams of a 1-hydroxyethylidene-1,1-diphosphonic acid was gradually added thereto with stirring. Next, 28 grams of a tannic acid (containing nonvolatile component in an amount of 50%) was gradually added thereto with stirring. Thereafter, the hydrofluoric acid was added with stirring such that the concentration of free fluorine was 12 ppm with respect to the treating agent and, then, ammonia was added to adjust the pH of the treating agent to be 2.6. After continuously stirred for 10 minutes, a slightly brown surface-treating solution was obtained containing zirconium hydrofluoric acid at a concentration of 200 ppm as zirconium, containing 1-hydroxyethylidene-1,1-diphosphonic acid at a concentration of 120 ppm as phosphorus and containing tannin at a concentration of 1400 ppm.

The above washed aluminum alloy plate was treated for its surfaces by spraying the surface-treating solution prepared above at a temperature of 50° C. for 5 seconds. The unreacted products were washed away with the tap water. The aluminum alloy plate was further washed with the deionized water of 3,000,000Ω or greater, followed by drying at 80° C. to obtain the surface-treated aluminum plate having an organic/inorganic composite treating layer B.

The amounts of components in the film were such that the zirconium compound was 10 mg/m$^2$ calculated as zirconium atoms, the organic phosphonic acid compound was 1.5 mg/m$^2$ calculated as phosphorus atoms, and the tannin was 15 mg/m$^2$ calculated as carbon atoms.

5. Measurement of the Amounts of Components in the Films.

The organic/inorganic composite treating film A and the organic/inorganic composite treating film B were measured for their amounts (mg/m$^2$) of zirconium and phosphorus in the formed organic/inorganic composite surface treating layers by using a fluorescent X-ray analyzer, XRF-1700, manufactured by Shimazu Mfg. Co. The amount (mg/m$^2$) of carbon was measured by using a multiphase carbon determinator, RC 412, manufactured by LECO Co., U.S.A. The sample size was 32 cm$^2$ and the measurement was taken under the conditions of 400° C. for 8 minutes.

(Preparation of Epoxy Solutions for Primers)

400 Parts by weight of an epoxy resin, Epikote 1010 (molecular weight of 5,500, epoxy equivalent of 4,000) manufactured by Japan Epoxy Resin Co., 100 parts by weight of Epikote 1009 (molecular weight of 3,800, epoxy equivalent of 3,000), 500 parts by weight of a diethylene glycol monobutyl ether as a solvent, 400 parts by weight of a cellosolve acetate, 300 parts by weight of an n-butanol and 50 parts by weight of a xylene were heated up to 140° C. with stirring. After homogeneously mixed together, the mixture was cooled down to room temperature to obtain an epoxy solution having a molecular weight of 5,200 and an epoxy equivalent of 3,850 (used for the primers of Examples 1 to 30, Comparative Examples 1 to 18).

(Preparation of Polyester Resins for Primers)

400 Parts of terephthalic acid, 400 parts of isophthalic acid, 500 parts of ethylene glycol, 500 parts of neopentyl glycol and 0.5 parts of titanium tetrabutoxide were fed into a four-way flask, and the temperature was gradually elevated up to 235° C. over 4 hours so as to be esterified. Thereafter, water was distilled off in a predetermined amount, the initial polymerization was conducted for 30 minutes under a reduced pressure, the temperature was further elevated up to 255° C. to conduct the polymerization for 80 minutes. After having confirmed that a target molecular weight was reached, the temperature was lowered down to 220° C. in a nitrogen atmosphere. Thereafter, 20 parts of an ethylene glycol bistrimellitic dianhydride and 20 parts of a trimellitic anhydride were thrown thereinto, and the mixture was stirred in a nitrogen atmosphere at 200° C. to 230° C. for one hour to obtain a desired carboxyl group-introduced polyester resin. The carboxyl group-introduced polyester resin was measured for its number average molecular weight calculated as that of the styrene by using the gel permeation chromatography (GPC) to be 12,000. Further, 1 g of the carboxyl group-introduced polyester resin was dissolved in 100 cc of chloroform and was titrated with a 0.1 N KOH ethanol solution to measure the equivalent (acid value) per kilogram of the resin to be 380 meq/Kg.

Further, 70% by weight of the carboxyl group-introduced polyester resin and 30% by weight of a polyester resin (GK 880 produced by Toyobo Co., number average molecular weight: 18,000, acid value: 60 meq/Kg) into which no carboxyl group has been introduced were blended together to prepare a polyester resin (polyester A) which was used in Examples 31 to 36, 41 to 44 and in Comparative Examples 19 to 21). Examples 37 to 40 have used a blend of 30% by weight of the carboxyl group-introduced polyester resin and 70% by weight of the polyester resin (GK 880 produced by Toyobo Co., number average molecular weight: 18,000, acid value: 60 meq/Kg) into which no carboxyl group has been introduced as a polyester B.

(Preparation of Resoles for Primers)

400 Parts by weight of 3,5-xylenol, 100 parts by weight of p-cresol, 250 parts by weight of formalin, 900 parts by weight of n-butanol as a solvent, 400 parts by weight of xylene and 300 parts by weight of cyclohexanone were reacted together in the presence of a magnesium hydroxide catalyst at 100° C. for 100 minutes and refined to prepare a resole-type phenol formaldehyde resin solution. The resole-type phenol resin was measured for its degree of methylolation by using an NMR, EX-270, manufactured by Nihon Denshi Co. (observed nucleus: $^{13}$C, measuring mode: BCM, number of integration: 5,000) to be 0.6 methylol groups per a benzene ring (used for the primers in Examples 2, 5, 6, 12, 15, 16, 22, 25 and 26).

Similarly, by adjusting the kinds of phenols, amounts of formalin (or formit depending upon the cases) and reaction time, there were further produced resole-type formaldehyde resin solutions by changing the kinds of phenols and the concentration of methylol groups as shown in Tables 1 and 2.

(Preparation of Primers)

Primers were prepared by mixing together the above epoxy resin solution for primers or the polyester resin for primers and the resole-type phenolformaldehyde resin for primers in combinations and at weight ratios of solid components as shown in Tables 1 and 2, pre-condensing them together, and by being blended with the dodecylbenzenesulfonic acid at a ratio of 0.5 parts by weight with respect to the solid components.

(Preparation of Films)

A polyethylene terephthalate copolymerized with 11 mol % of an isophthalic acid and containing 0.1% by weight of a truly spherical silica particle having an average particle size of 1.5 μm and a particle size ratio of 1.0 to 1.2, was melt-extruded at 260 to 290° C., quickly cooled and solidified on a rotary drum to obtain an undrawn film thereof which was, then drawn in the longitudinal direction into 3 to 5 times at 80 to 110° C. and was drawn in the transverse direction into 3 to 5 times at 90 to 130° C. Thereafter, the film was heat-set at 160 to 195° C. The film after drawn possessed a thickness of 30 μm.

(Application of the Primer onto the Film)

The primer was applied onto one surface of the film so that the amount thereof was 10 mg/dm$^2$ as a solid component, and was dried in an oven heated at 100° C.

(Preparation of Laminated Plates)

The surface-treated aluminum plate was heated at 230° C., and the isophthalic acid-copolymerized polyethylene terephthalate resin film on which the above primer has been applied was heat-laminated at a laminate roll temperature of 150° C. and a plate-passing speed of 150 m/min. in a manner that the surface coated with the primer was on the side of the aluminum plate, immediately followed by cooling with water to thereby prepare a one-surface-laminated aluminum alloy plate.

(Application of a Coating Material onto the Outer Surface)

An epoxyurea coating material was applied onto the non-laminated surface of the above one-surface-laminated aluminum alloy plate (so that the film thickness after drying was 3 μm) and was baked at 185° C. for 10 minutes to obtain a blank for the aluminum alloy can end.

(Formation of Can Ends)

The resin-coated blank for the aluminum alloy can end obtained above was punched into a disk of a diameter of 68.7 mm in such a direction that the resin-coated surface was the inner surface of the end. Next, the outer surface side of the end was subjected to the score working of the partial-open type (width: 22 mm, remaining thickness of score: 110 μm, score width: 20 μm) and to the rivet working, and to which a tab for opening was attached to thereby obtain an easy open end.

(Method of Evaluation)

The easy open ends were evaluated as described below to obtain the results as shown in Tables 1 and 2.

1. Evaluation of Feathering.

The obtained easy open ends were subjected to the retort sterilization treatment (at 130° C. for 50 minutes), dipped in hot water of 60° C., and were opened in hot water maintained at 60° C. to evaluate the occurrence of feathering at the opened portions. Two hundred ends were evaluated for each kind, an average feathering length of 200 ends was calculated based on the maximum feathering lengths of the ends, and was evaluated as shown in Tables 1 and 2 on the following basis.

◯: An average feathering length was less than 1.0 mm.

Δ: An average feathering length was not less than 1.0 mm but was less than 1.5 mm.

X: An average feathering length was not less than 1.5 mm but was less than 3.0 mm.

XX: An average feathering length was not less than 3.0 mm.

Products marked with ◯ and Δ were evaluated to be practically usable.

2. Evaluation of Openability.

The obtained easy open ends were subjected to the retort sterilization treatment (at 130° C. for 50 minutes), dipped in hot water of 60° C., and were opened in hot water maintained at 60° C. to evaluate the openability. Two hundred ends were evaluated for each kind.

The results of evaluation were expressed by the numbers of defective openings for example breakage of tab/numbers of openings as shown in Table 1.

3. Pack Testing.

Welded can bodies for foods in general were filled with a corn soup, double-seamed with the above easy open ends according to a customary method, and were sterilized at 130° C. for 50 minutes. The cans were stored at 55° C. for 2 months in a state where the easy open ends were on the lower side. Thereafter, the double-seamed portions were cut by using a can opener to separate the ends from the can bodies, and the inner surfaces of the ends were observed by using a microscope for the occurrence of corrosion and were evaluated. Fifty ends were evaluated for each kind, and the results of evaluation were as shown in Tables 1 and 2. If corrosion was observed on even one of the ends, this was stated in Tables.

TABLE 1

| | | Primer | | | |
|---|---|---|---|---|---|
| | | | | Phenol resin | |
| | | Surface treatment | Polyester or epoxy resin | Resin | Methylol groups per benzene ring | Polyester or epoxy/ phenol ratio |
| Example | 1 | treated with Cr phosphate | epoxy | resin A | 0.2 | 75/25 |
| | 2 | | | | 0.6 | |
| | 3 | | | | 1.2 | |
| | 4 | | | | 2.0 | |
| | 5 | | | | 0.6 | 60/40 |
| | 6 | | | | | 85/15 |
| | 7 | | | resin B | 0.2 | 75/25 |
| | 8 | | | | 0.7 | |
| | 9 | | | | 1.5 | |
| | 10 | | | | 2.0 | |
| | 11 | treated with Zr phosphate | epoxy | resin A | 0.2 | 75/25 |
| | 12 | | | | 0.6 | |
| | 13 | | | | 1.2 | |
| | 14 | | | | 2.0 | |
| | 15 | | | | 0.6 | 60/40 |
| | 16 | | | | | 85/15 |
| | 17 | | | resin B | 0.2 | 75/25 |
| | 18 | | | | 0.7 | |
| | 19 | | | | 1.5 | |
| | 20 | | | | 2.0 | |
| | 21 | org/inorg composite treatment A | epoxy | resin A | 0.2 | 75/25 |
| | 22 | | | | 0.6 | |
| | 23 | | | | 1.2 | |
| | 24 | | | | 2.0 | |
| | 25 | | | | 0.6 | 60/40 |
| | 26 | | | | | 85/15 |
| | 27 | | | resin B | 0.2 | 75/25 |
| | 28 | | | | 0.7 | |
| | 29 | | | | 1.5 | |
| | 30 | | | | 2.0 | |

TABLE 1-continued

| | | | | | |
|---|---|---|---|---|---|
| 31 | | polyester | resin C | 0.2 | 70/30 |
| 32 | | A | | 0.6 | |
| 33 | | | | 1.2 | |
| 34 | | | | 2.0 | |
| 35 | | | | 0.6 | 60/40 |
| 36 | | | | | 80/20 |
| 37 | | polyester | resin C | 0.2 | 70/30 |
| 38 | | B | | 0.6 | |
| 39 | | | | 1.2 | |
| 40 | | | | 2.0 | |
| 41 | org/inorg | polyester | resin C | 0.2 | 70/30 |
| 42 | composite | A | | 0.6 | |
| 43 | treatment | | | 1.2 | |
| 44 | B | | | 2.0 | |

| | | Evaluation of end | | |
|---|---|---|---|---|
| | | Opened in 60° C. hot water | | |
| | | Feathering | Openability | Pack testing |
| Example | 1 | ○ | 0/200 | normal |
| | 2 | ○ | 0/200 | normal |
| | 3 | ○ | 0/200 | normal |
| | 4 | Δ | 0/200 | normal |
| | 5 | ○ | 0/200 | normal |
| | 6 | ○ | 0/200 | normal |
| | 7 | ○ | 0/200 | normal |
| | 8 | ○ | 0/200 | normal |
| | 9 | ○ | 0/200 | normal |
| | 10 | Δ | 0/200 | normal |
| | 11 | ○ | 0/200 | normal |
| | 12 | ○ | 0/200 | normal |
| | 13 | ○ | 0/200 | normal |
| | 14 | Δ | 0/200 | normal |
| | 15 | ○ | 0/200 | normal |
| | 16 | ○ | 0/200 | normal |
| | 17 | ○ | 0/200 | normal |
| | 18 | ○ | 0/200 | normal |
| | 19 | ○ | 0/200 | normal |
| | 20 | Δ | 0/200 | normal |
| Example | 21 | ○ | 0/200 | normal |
| | 22 | ○ | 0/200 | normal |
| | 23 | ○ | 0/200 | normal |
| | 24 | Δ | 0/200 | normal |
| | 25 | ○ | 0/200 | normal |
| | 26 | ○ | 0/200 | normal |
| | 27 | ○ | 0/200 | normal |
| | 28 | ○ | 0/200 | normal |
| | 29 | ○ | 0/200 | normal |
| | 30 | Δ | 0/200 | normal |
| | 31 | ○ | 0/200 | normal |
| | 32 | ○ | 0/200 | normal |
| | 33 | ○ | 0/200 | normal |
| | 34 | Δ | 0/200 | normal |
| | 35 | ○ | 0/200 | normal |
| | 36 | ○ | 0/200 | normal |
| | 37 | Δ | 0/200 | normal |
| | 38 | Δ | 0/200 | normal |
| | 39 | Δ | 0/200 | normal |
| | 40 | Δ | 0/200 | normal |
| | 41 | ○ | 0/200 | normal |
| | 42 | ○ | 0/200 | normal |
| | 43 | ○ | 0/200 | normal |
| | 44 | Δ | 0/200 | normal |

* Phenol resin A: 3,5-xylenol, p-cresol type resole
* Phenol resin B: bisphenol A type resole
* Phenol resin C: m-cresole type resole

TABLE 2

| | | | | Primer | | |
|---|---|---|---|---|---|---|
| | | | | | Phenol resin | |
| | | | Surface treatment | Polyester or epoxy resin | Resin | Methylol groups per benzene ring | Polyester or epoxy/ phenol ratio |
| Comp. Example | 1 | treated with Cr phosphate | epoxy | resin A | 0.08 | 75/25 |
| | 2 | | | | 0.19 | |
| | 3 | | | | 2.2 | |
| | 4 | | | resin B | 0.15 | 75/25 |
| | 5 | | | | 0.19 | |
| | 6 | | | | 2.2 | |
| | 7 | treated with Zr phosphate | epoxy | resin A | 0.08 | 75/25 |
| | 8 | | | | 0.19 | |
| | 9 | | | | 2.2 | |
| | 10 | | | resin B | 0.15 | 75/25 |
| | 11 | | | | 0.19 | |
| | 12 | | | | 2.2 | |
| | 13 | org/inorg composite treatment A | epoxy | resin A | 0.08 | 75/25 |
| | 14 | | | | 0.19 | |
| | 15 | | | | 2.2 | |
| | 16 | | | resin B | 0.15 | 75/25 |
| | 17 | | | | 0.19 | |
| | 18 | | | | 2.2 | |
| | 19 | | polyester A | resin C | 0.1 | 70/30 |
| | 20 | | | | 0.19 | |
| | 21 | | | | 2.1 | |

| | | Evaluation of end | | |
|---|---|---|---|---|
| | | Opened in 60° C. hot water | | |
| | | Feathering | Openability | Pack testing |
| Comp. Example | 1 | xx | 102/200 | rivet/score corroded |
| | 2 | x | 0/200 | normal |
| | 3 | x | 3/200 | rivet corroded very little |
| | 4 | xx | 83/200 | rivet/score corroded |
| | 5 | x | 0/200 | normal |
| | 6 | x | 5/200 | rivet/score corroded very little |
| | 7 | xx | 82/200 | rivet/score corroded |
| | 8 | x | 0/200 | normal |
| | 9 | x | 1/200 | rivet corroded very little |
| | 10 | xx | 58/200 | rivet/score corroded |
| | 11 | x | 0/200 | normal |
| | 12 | x | 2/200 | rivet/score corroded very little |
| | 13 | xx | 53/200 | rivet/score corroded |
| | 14 | x | 0/200 | normal |
| | 15 | x | 1/200 | rivet corroded very little |
| | 16 | xx | 38/200 | rivet/score corroded |
| | 17 | x | 0/200 | normal |
| | 18 | x | 3/200 | rivet corroded very little |
| | 19 | xx | 35/200 | normal |
| | 20 | x | 1/200 | normal |
| | 21 | x | 2/200 | normal |

* Phenol resin A: 3,5-xylenol, p-cresol type
* Phenol resin B: bisphenol A type resole
* Phenol resin C: m-cresole type resole

The invention claimed is:

1. An easy open end of a stay-on-tab featuring openability at high temperatures, comprising a resin-coated metal plate obtained by coating a metal substrate with a polyester film via a primer, wherein
said polyester film comprises a copolymerized polyethylene terephthalate containing not more than 30 mol % of an isophthalic acid and has an intrinsic viscosity of 0.52 to 0.70 dl/g, and said primer comprises an epoxy resin and a resole-type phenol resin, said resole-type phenol resin is a copolymer of formaldehyde and a phenol compound comprising 3,5-xylenol and p-cresol and has 0.2 to 2.0 methylol groups per benzene ring; and the blending ratio of the epoxy resin and the resole-type phenol resin is 60:40 to 85:15.

2. The easy open end according to claim 1, wherein said epoxy resin has a number average molecular weight in a range of 2,800 to 8,000.

* * * * *